April 1, 1969 M. R. SUNDQUIST 3,436,535

MULTIPLYING CIRCUIT BASED ON AMPLITUDE TO TIME CONVERSION

Filed May 12, 1966 Sheet 1 of 3

INVENTOR
M. R. SUNDQUIST
BY H. L. Logan
ATTORNEY

| TIME IN FIGS. 2A-2F | S | S' | D | E | TRANSISTOR 18 | TRANSISTOR 19 | ACTION PERFORMED |
|---|---|---|---|---|---|---|---|
| BEFORE $t_1$ | 0 | 1 | 0 | 0 | ON | OFF | CAPACITORS 23 AND 39 CHARGED OR BEING CHARGED |
| $t_1$ TO $t_3$ | 1 | 0 | 0 | 1 | OFF | ON | CAP. 23 DISCHARGING FROM $t_1$ TO $t_3$; CAP. 39 DISCHARGING FROM $t_2$ TO $t_3$ |
| $t_3$ TO $t_4$ | 1 | 0 | 1 | 0 | OFF | OFF | CAP. 23 VOLTAGE HELD; CAP. 29 STILL DISCHARGING |

United States Patent Office 3,436,535
Patented Apr. 1, 1969

3,436,535

MULTIPLYING CIRCUIT BASED ON AMPLITUDE TO TIME CONVERSION

Milton R. Sundquist, Burlington, N.C., assignor to Bell Telephone Laboratories, Incorporated, New York, N.Y., a corporation of New York Filed May 12, 1966, Ser. No. 549,522
Int. Cl. G06g *7/16, 7/12*
U.S. Cl. 235—194 4 Claims This invention relates to analog computing circuits for multiplying two voltages.

Performing multiplication through the use of electrical circuits presents a problem when speed and accuracy are important considerations. One technique that has been devised to overcome this problem introduces, uses and then eliminates time as a dependent parameter. This technique is analogous to the mathematical one using logarithms.

One or more limitations exist in prior art circuits using the above-mentioned technique. Some of these circuits for example, present loading problems because input signals are used to charge capacitors. Furthermore, some have relatively small dynamic operating ranges because their operations are limited to the relatively straight portions of RC charging curves. Still further, some prior art circuits produce accurate outputs only when they are operating in a regular cyclic manner; they are not useful, therefore, when the inputs are of a random sample nature. Any one or more of these limitations is frequently unacceptable.

An object of the present invention is to compute the product of two voltages with a high degree of accuracy and within a submicrosecond time interval.

Another object of the invention is to increase the dynamic range of analog computing circuits.

These and other objects are achieved in accordance with the invention through the use of two voltages which change exponentially at substantially the same rate. A first of these voltages begins to exponentially change in response to an external signal. When this voltage passes through a predetermined level, the second voltage begins to exponentially change. The first exponentially changing voltage is clamped when the second voltage passes through a predetermined level. The clamped level of the first voltage is the product of a constant and the two predetermined levels. If the two voltages exponentially decay from initial levels of one volt, this constant equals one and the clamped output is the product of the two predetermined levels.

A feature of the invention is that exponential generators are charged by internal power supplies rather than by input voltages as in prior art circuits. In particular, input voltages are used only for triggering and threshold detection, thus reducing input loading, if any, to a minor level.

Another feature of the invention is that a relatively large dynamic operating range is achieved because operation is not limited to the relatively straight portions of exponential curves.

Still another feature is that the computing circuit is preconditioned in response to the termination of a previous computation. The circuit need not be operated, therefore, in a cyclic manner in order to produce accurate outputs.

Other objects and features of the invention will become apparent from a study of the following detailed description of an illustrative embodiment.

In the drawings:

FIG. 3 is a schematic diagram of the embodiment of FIG. 1; and

Figure 1:
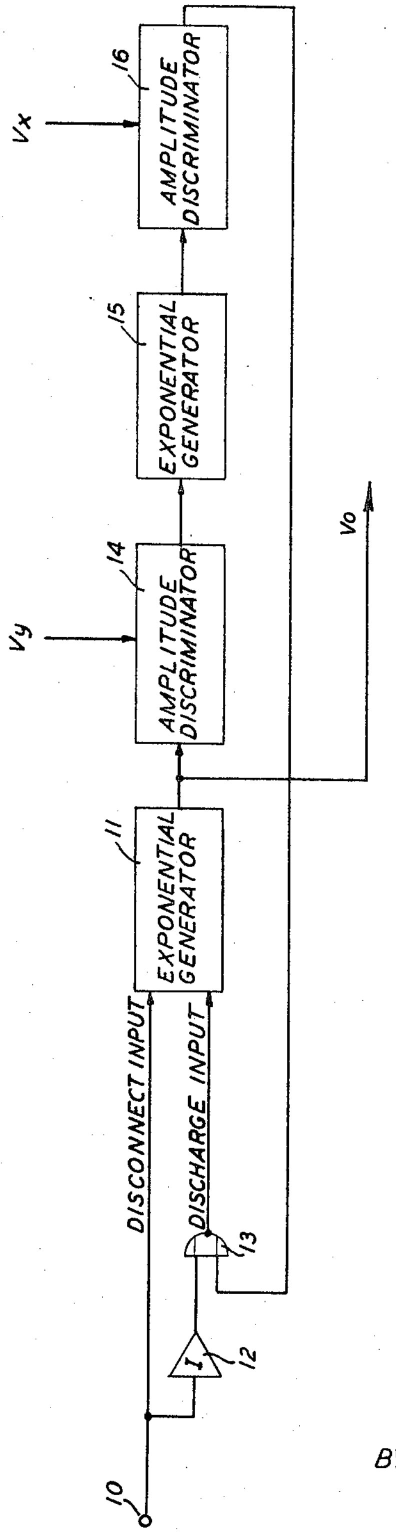
FIG. 1 is a block diagram of an embodiment of the invention.

The block diagram of FIG. 1 includes an input terminal 10 which is connected to a disconnect input on an exponential generator 11. This terminal is also connected to a discharge input on the generator by way of an inverter 12 and an OR gate 13 that has an inverted output. (Schematic diagrams of circuits that may be used in the various blocks of FIG. 1 are disclosed in FIG. 3.) Generator 11 produces an exponentially decaying output when a voltage is applied to both of its inputs. When a voltage is applied only to the disconnect input, the output of generator 11 is held constant. Voltage on neither input permits the generator to reset.

The output of generator 11 is applied to an amplitude discriminator 14 which has a voltage $V_y$ applied to a second signal. Discriminator 14 produces an output when its input from generator 11 is less than its other input. The discriminator output is applied to an exponential generator 15 as a start input.

In response to a start input, generator 15 produces a voltage that exponentially decays at the same rate as the output of generator 11. The output of generator 15 is applied as an input to a discriminator 16 while a voltage $V_x$ is applied to a second input of the discriminator. Discriminator 16 produces an output when its input from generator 15 is less than its other input. The output is fed back to OR gate 13.

The operation of FIG. 1 may be better understood by referring to the waveforms of FIGS. 2A through 2F. These waveforms have been placed in time alignment so that the time scale indicated in FIG. 2F applies as well to FIGS. 2A through 2E.

Prior to time $t1$, terminal 10 is at zero potential and the outputs of generators 11 and 15 are E1 volts. At time $t1$, positive voltages (FIGS. 2A and 2B) are applied to the two inputs of generator 11 and the output (FIG. 2C) of generator 11 begins to decay exponentially. At time $t2$, the level of generator 11 output passes through the level of voltage $V_y$ and the output (FIG. 2D) of discriminator 14 assumes a positive potential. When this occurs, the output (FIG. 2E) of generator 15 begins to decay exponentially and at time $t3$ passes through the level of voltage $V_x$. At this time the output (FIG. 2F) of discriminator 16 assumes a positive potential. This positive potential causes the positive potential on the discharge input of generator 11 to be removed with the result that the generator output (FIG. 2C) is clamped.

At time $t4$ the input (FIG. 2A) of generator 11 returns to zero volts and generator 11 recharges to produce an output (FIG. 2C) of E1 volts. When generator 11 recharges, the outputs (FIG. 2D and 2F) of discriminators 14 and 16 return to a zero voltage level. Generator 15 also resets (FIG. 2E) to its E1 output voltage level. At this point in time the embodiment has completed one cycle and is ready to begin another.

Figure 2A:
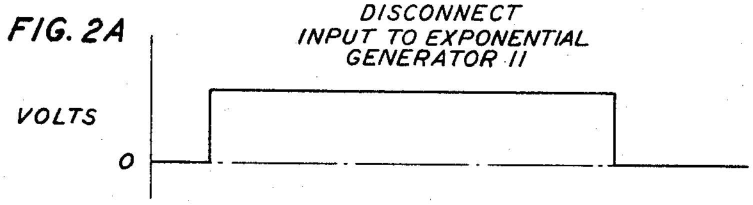
FIGS. 2A through 2F are waveforms of input and output voltage blocks in FIG. 1.
Figure 2B:
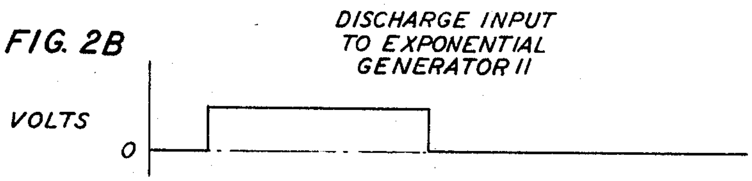
Figure 2C:
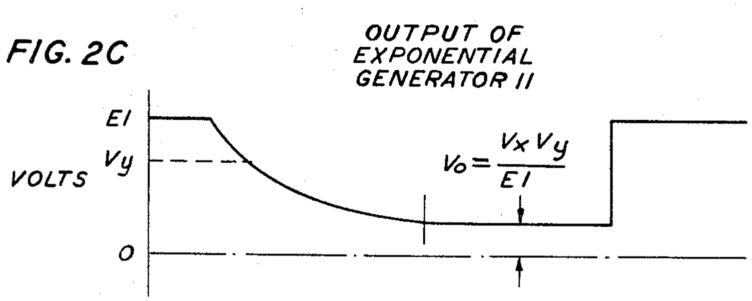
Figure 2D:
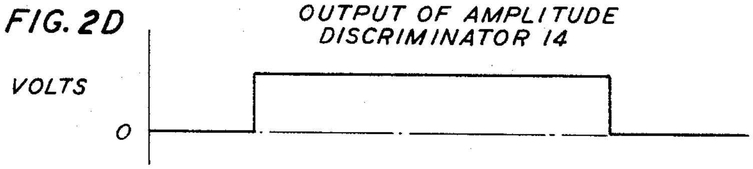
Figure 2E:
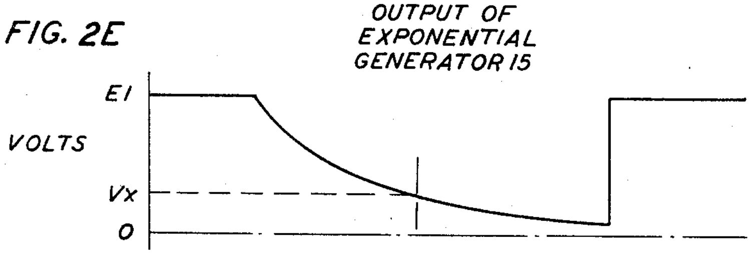
Figure 2F:
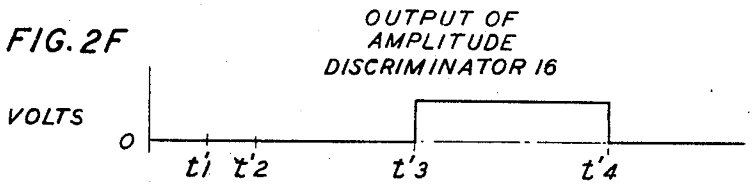

The clamped output $V_o$ (FIG. 2C) of generator 11 in the interval $t3-t4$ represents the product of voltage V$x$ and voltage V$y$ divided by the voltage E1. This is believed apparent from the following equations:

$$Vy=E1\epsilon^{-(t2-t1)/T} \quad (1)$$

where T is the time constant of generator 11;

$$\text{from (1), } (t2-t1)=-T\ \ln\frac{Vy}{E1} \quad (2)$$

$$Vx=E1\epsilon^{-(t3-t2)/T} \quad (3)$$

where T is the time constant of generator 15 and is equal to that of generator 11;

$$\text{from (3), } (t3-t2)=-T\ \ln\frac{Vx}{E1} \quad (4)$$

$$\text{from (2) and (4), } (t3-t1)=-T\ \ln\frac{Vx}{E1}-T\ \ln\frac{Vy}{E1} \quad (5)$$

$$\text{from (5), } \frac{(Vx)(Vy)}{(E1)^2}=\epsilon^{-(t3-t1)/T} \quad (6)$$

between times $t3-t4$ of FIG. 2C, $$Vo=E1\epsilon^{-(t3-t1)/T} \quad (7)$$

and $$\text{from (6) and (7), } Vo\frac{(Vx)(Vy)}{E1} \quad (8)$$

$$\text{when } E1=1 \text{ volt, } Vo=(Vx)(Vy) \quad (9)$$

The circuit shown schematically in FIG. 3 includes an exponential generator 11 comprising transistors 17, 18 and 19, resistors 20, 21 and 22 and a capacitor 23. In its standby condition, transistors 17 and 19 are non-conducting and transistor 18 is conducting. Capacitor 23 is therefore charged to a voltage E1. When a positive potential is applied to terminal 10, transistor 17 conducts and transistor 18 turns off.

FIG. 3 also includes an inverter 12 comprising a transistor 24 and a resistor 25. It further includes an inverting OR gate 13 comprising transistors 26 and 27 and a resistor 28. Prior to the application of a positive voltage to terminal 10, transistors 24 and 27 are nonconducting while transistor 26 is conducting. When a positive potential is applied to terminal 10, transistors 24 conducts and transistor 26 turns off. Furthermore, transistor 19 conducts when transistor 27 is nonconducting and is nonconductive when transistor 27 is conducting. This will be better appreciated after a later discussion of FIG. 4.

FIG. 3 further includes an amplitude discriminator 14 comprising a pair of transistors 29 and 30 and a plurality of resistors 31 through 34. Prior to the application of a positive voltage to terminal 10, the voltage across capacitor 23 causes transistor 29 to conduct. This produces a voltage drop across resistor 34 which, in combination with voltage Vy on the transistor base, back biases transistor 30. Transistor 30 is therefore cut off. When a positive voltage is applied to terminal 10, capacitor 23 discharges and the voltage drop across resistor 34 decreases. When this drop and voltage Vy no longer back bias transistor 30, transistor 30 conducts to produce a drop across resistor 34 that results in turning off transistor 29. The collector of transistor 29 thereby switches from approximately ground potential to a positive potential.

Exponential generator 15 of FIG. 3 comprises a transistor 35, a plurality of resistors 36 through 38 and a capacitor 39. When transistor 29 is conducting, transistor 35 is non-conducting as a result of a substantially ground potential on the collector of transistor 29. Capacitor 39 is therefore charged to approximately E1 volts. When transistor 29 turns off, transistor 35 conducts, capacitor 39 begins discharging in an exponential manner through resistor 37 and transistor 35.

Amplitude discriminator 16 in FIG. 3 comprises a pair of transistors 40 and 41 and a plurality of resistors 42 through 45. The operation of this discriminator is identical to that presented above with respect to discriminator 14. As voltage V$x$ is less than voltage V$y$, transistor 40 turns off later than transistor 29. When it turns off, a positive potential is applied to transistor 27, thereby turning on this transistor.

Figure 4:
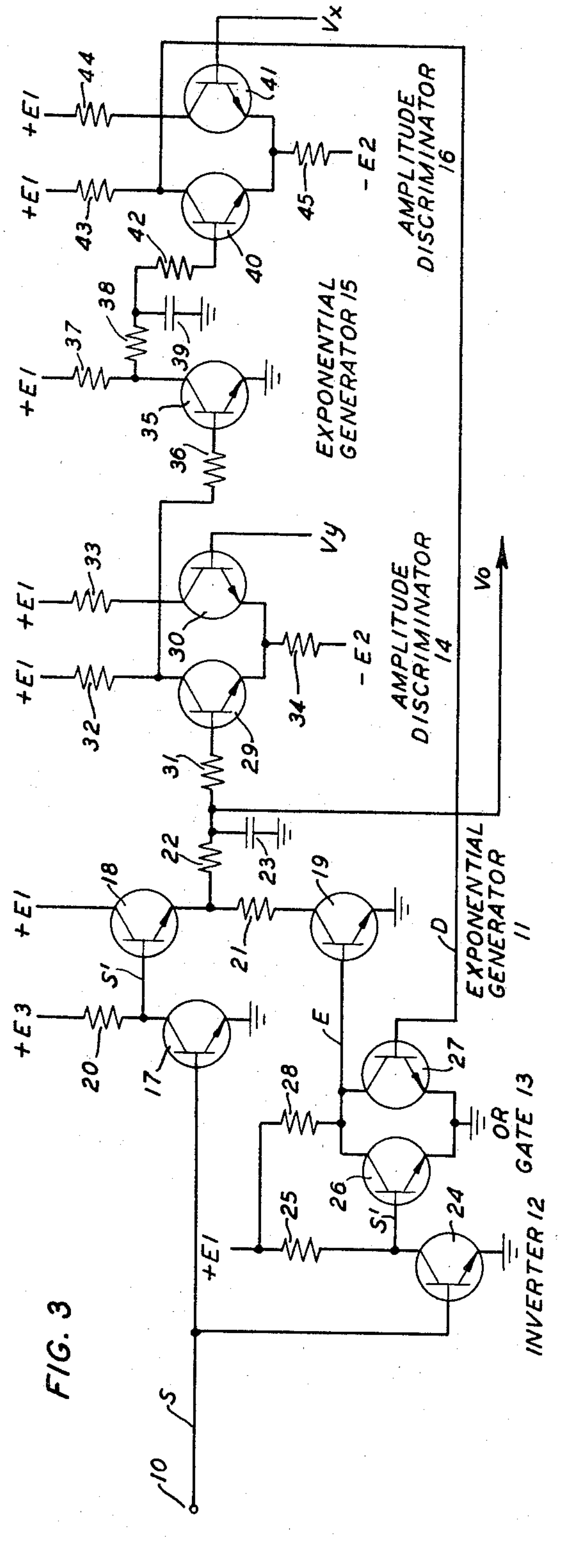
FIG. 4 is a chart illustrating the manner in which the transistors of FIG. 3 are controlled.

The manner in which transistors 18 and 19 of FIG. 3 are controlled may be further appreciated by referring to the chart shown in FIG. 4 and the waveforms of FIGS, 2A through 2F. For purposes of explanation, the voltage (FIG. 2A) appearing on terminal 10 has been identified as S while its opposite appearing on the collectors of transistors 17 and 24 has been identified as S'. Furthermore, the output (FIG. 2F) of discriminator 16 has been identified as D while the discharge input (FIG. 2B) of generator 11 (that is the voltage on the base of transistor 19) has been identified as E. Still further in FIG. 4 the substantially ground potential levels of these voltages have been identified by logic zeros while their positive levels have been identified by logic ones. The chart therefore takes the form of a logic truth table and is believed to be self-explanatory.

From the above discussion, it is believed apparent that voltage V$o$ is related by a constant to the product of voltages V$x$ and V$y$ during a sampling interval produced by the voltage applied to terminal 10. Furthermore, it is believed apparent that this output is produced accurately even though only a single sample is taken; in other words, it is not necessary to have the circuit operate in a regular cyclic manner in order to produce a useful output.

Although only one embodiment of the invention has been disclosed and discussed in detail, various other embodiments may be devised by those skilled in the art without departing from the spirit and scope of the invention. Furthermore, various individual circuits other than the ones disclosed may be used in embodiments of the invention. The amplitude discriminators, for example, may take the form of multiar circuits, combinations of amplifiers and flip-flops, Schmitt trigger circuits or tunnel diode circuits.

What is claimed is:

1. A combination comprising:

first and second generating means responsive to input voltages to produce output voltages that change exponentially with respect to time at substantially the same time constant, means to apply an input voltage to said first generating means, first amplitude discriminating means to apply an input voltage to said second generating means in response to the level of said first generating means output voltage passing a first predetermined level, second amplitude discriminating means to apply a voltage to said first generating means to clamp its output voltage in response to said second generating means output voltage passing a second predetermined level, and an output terminal connected to said first generator.

2. In combination:

first means responsive to a first voltage to produce an exponentially changing output voltage and further responsive to a second voltage to hold the level of said output voltage, second means to produce an output in response to said first means output voltage passing through a first predetermined level, third means responsive to said second means output to produce an exponentially changing output voltage having substantially the same time constant as that of said first means output voltage, fourth means to produce said second voltage applied to said first means in response to said third means output voltage passing through a second predetermined level, and an output terminal connected to said first means.

3. A computing circuit comprising:

a first exponential generator having a first input which when energized disconnects said first generator from a charging source and a second input which when energized causes said first generator output voltage to decay at an exponential rate, a first amplitude discriminator connected to said first generator to produce a particular output in response to said first generator output voltage being less than a first predetermined level, a second exponential generator having an input connected to said first discriminator and responsive to said first discriminator particular output to cause said second generator output voltage to decay at an exponential rate substantially equal to that of said first generator output, a second amplitude discriminator connected to said second generator to produce a particular output in response to said second generator output voltage being less than a second predetermined level, logic circuit means having a first input connected to said first generator first input, a second input connected to said second discriminator output and an output connected to said first generator second input to energize said first generator second input only in response to said first generator first input being energized and said second discriminator output being other than said second discriminator particular output, means for energizing said first generator first input, and an output terminal connected to said first generator.

4. A computing circuit in accordance with claim 3 in which said logic circuit means comprises:

an OR gate that produces an inverted output and an inverter having its output connected to an input of said OR gate, the input to said inverter being said logic circuit means input connected to said first generator first input and an input of said OR gate being said logic circuit means input connected to said second discriminator output.

References Cited

UNITED STATES PATENTS

| | | | |
|---|---|---|---|
| 3,205,348 | 9/1965 | Kleinberg | 235—196 |
| 3,309,510 | 3/1967 | Brown | 235—194 |

MALCOLM A. MORRISON, *Primary Examiner.*

JOSEPH F. RUGGIERO, *Assistant Examiner.*

U.S. Cl. X.R.

307—229